B. F. MERTZ.
VEHICLE WHEEL WITH DEMOUNTABLE RIM.
APPLICATION FILED JUNE 16, 1914.
1,142,350.
Patented June 8, 1915.
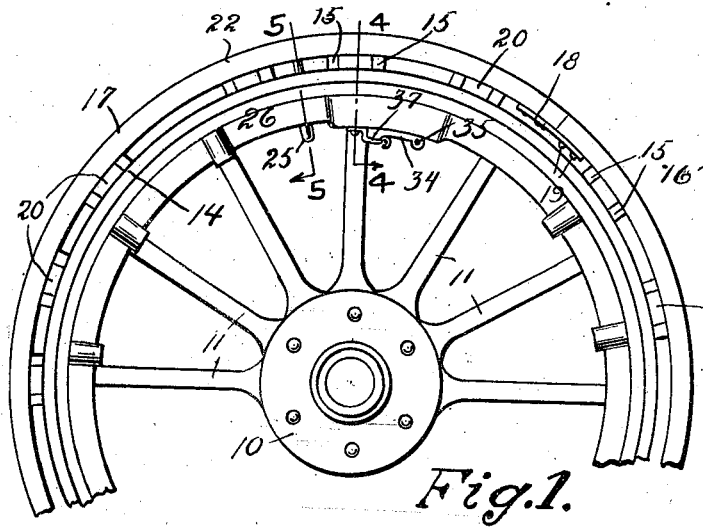
Fig.1.
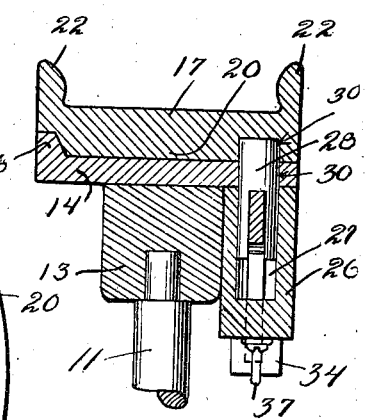
Fig.4.
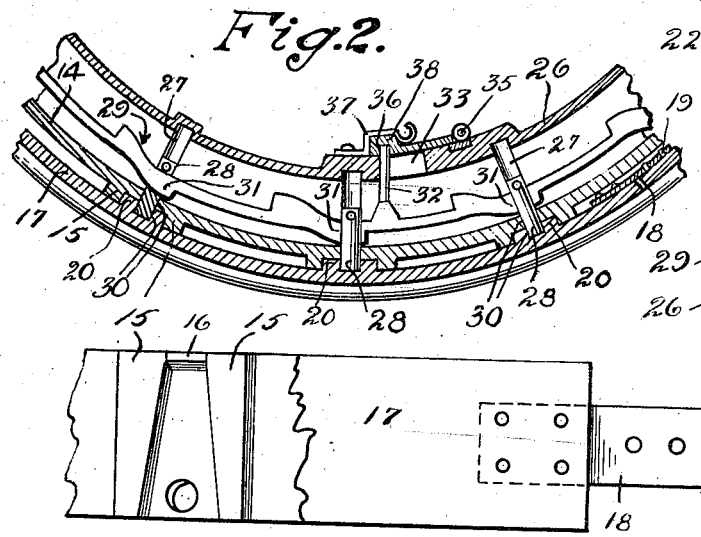
Fig.2.
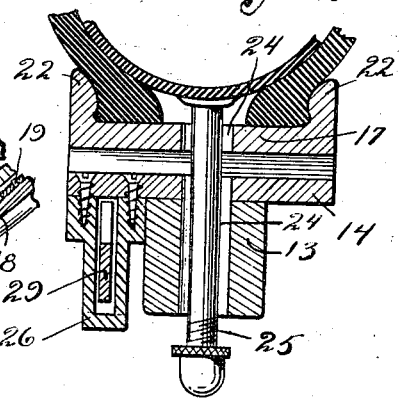
Fig.5.
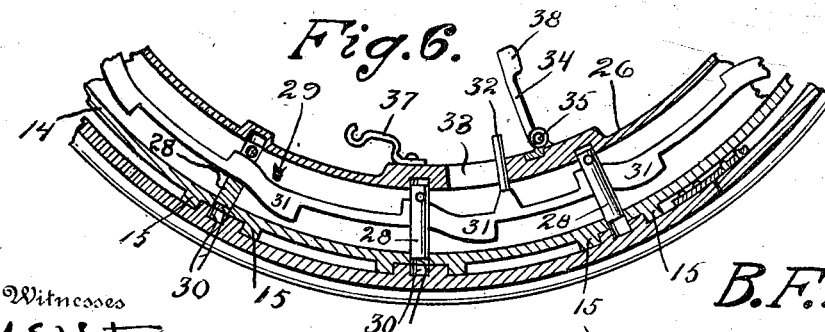
Fig.6.
Fig.3.
Witnesses
M. S. Watson
J. Mester
Inventor
B. F. Mertz
By
Attorneys ized, the ends of the rim are slipped one under the other so that the tire may be easily placed thereon with the stem 25 passing through the holes 24. The plate 18 is then reëngaged upon the studs 19 and the rim is then placed upon the felly band as previously described.

UNITED STATES PATENT OFFICE.

BOYD FISHER MERTZ, OF NORTHUMBERLAND, PENNSYLVANIA.

VEHICLE-WHEEL WITH DEMOUNTABLE RIM.

1,142,350.

Specification of Letters Patent.

Patented June 8, 1915.

Application filed June 16, 1914. Serial No. 845,458.

*To all whom it may concern:*

Be it known that I, BOYD FISHER MERTZ, a citizen of the United States, residing at Northumberland, in the county of Northumberland, State of Pennsylvania, have invented certain new and useful Improvements in Vehicle-Wheels with Demountable Rims; and I do hereby declare the following to be a full, clear, and exact description of the invention, such as will enable others skilled in the art to which it appertains to make and use the same.

This invention relates to wheels for motor vehicles, especially to wheels adapted to carry pneumatic tires and has for its object the provision of a novel wheel provided with a rim which is quickly and easily detachable and which embodies novel means whereby the parts are securely held in their interlocked position.

An important object is the provision of a wheel and rim to which a tire may be easily applied.

A further object is the provision of novel means whereby the wheel and rim may be interlocked in one operation.

An additional object of the invention is the provision of a wheel and rim of this character which will be simple in construction, light in weight, strong and durable in use, efficient in service and a general improvement of the art.

Other objects and advantages will become apparent during the course of the following description, accompanied by the illustrative drawings, in which—

Figure 1 is an elevation of my novel wheel, Fig. 2 is an enlarged sectional view through a portion thereof showing the locking means in detail, Fig. 3 is a similar view showing the locking bolts retracted to permit disengagement of the rim, Fig. 4 is a cross sectional view on the line 4—4 of Fig. 1. Fig. 5 is a cross sectional view on the line 5—5 of Fig. 1, and Fig. 6 is a plan view of a fragment of the rim showing the connection of its ends, parts being broken away to show the periphery of the felly.

Referring more particularly to the drawing the numeral 10 designates the hub of my wheel which may be of any well known type or construction. Spokes 11 radiate from the hub 10 and engage at their outer ends in the felly 13 upon which is mounted a felly band 14. At spaced intervals along its periphery the felly band 14 is provided with spaced strips 15 having their inner opposing faces inclined as shown to form dove-tailed sockets or pockets for a purpose to be described. The ends of the strips 15 are connected by beveled strips 16.

My novel detachable rim comprises an annular ring 17 the ends of which are secured together by a plate 18 riveted upon one end of the ring 17 and provided at its other end with holes adapted to engage studs 19 carried by the other end of the ring 17. By this construction it will be seen that the ends of the ring 17 may be readily disconnected. Upon its inner periphery the ring 17 is provided with tongues 20 conforming in contour to and adapted to seat within the pockets formed by the strips 15 on the felly band. The rim is applied to the felly band by sliding the tongues 20 between the strips 15 until the edges of the rim register with the edges of the felly band 14, whereupon the inclined ends of the tongues 20 will engage the beveled strips 16.

In order that the rim may carry a tire I provide it with side flanges 22 adapted to engage the edges of a tire. The flanges 22 are reinforced adjacent the tongues 20 if desired. The felly 13, felly band 14 and the ring 17 of the rim are provided with alined openings 24 for the insertion of the valve stem 25 of the tire. The openings 24 are sufficiently large that the tire may be placed on or removed from the rim without danger of tearing loose the stem 25. The forward edge of the rim is slightly smaller than the rear edge to facilitate placing a tire thereon.

In assembling the wheel the plate 18 is preferably disengaged from the studs 19 and the ends of the rim are slipped one under the other so that the tire may be easily placed thereon with the stem 25 passing through the holes 24. The plate 18 is then reëngaged upon the studs 19 and the rim is then placed upon the felly band as previously described.

In order that the rim and felly may be securely locked together, I provide novel cam actuated locking means to be described. A substantially U-shaped shield 26 formed preferably of steel pressed in shape is disposed against one side of the felly 13 with the outer periphery of the shield engaging the inner periphery of the felly band 14. The shield 26 is provided at intervals along its length with sockets 27 within which are disposed radially slidable bolts 28 the inner ends of which are bifurcated for engagement with a cam locking ring designated as a whole by the numeral 29. The felly band and the tongues 20 on the rim are provided with alined holes 30 adapted for the reception of the bolts 28 when the bolts are protracted. This interlocked position is shown in Fig. 2 of the drawings.

The ring 29 is formed annular in one piece and has its periphery formed to provide cam or wedging portions 31. Furthermore, at intervals the ring 29 is provided with lugs or handles 32 extending inwardly through slots 33 in the inner portion of the shield 26. It will be seen that when the handles 32 are moved to the right to the extreme ends of the slots 33 the engagement of the outermost portions of the cam portions 31 with the bolts 28 will force the bolts outwardly into the holes 30. When the handles 32 are thus moved they are prevented from accidental movement within the shield by arms 34 pivoted as at 35 upon the inner periphery of the shield 26 adjacent the slots 33 and provided at their free ends with recesses 36 engaging the ends of the handles 32. A pivoted spring catch 37 is adapted to engage the enlarged head 38 of each arm 34 for preventing it from swinging open. The shield 26 may be secured upon the felly by bolts or screws as desired.

When it is desired to remove the rim from the wheel it is necessary to release the catches 37, swing the arms 34 toward the hub, and force the handles 32 to the left whereupon the cam portions of the cam locking ring 29 will allow the bolts 28 to retract thereby releasing them from their engagement with the holes 30. The rim may then be removed.

My rim and shield are formed preferably of as thin sheet steel as is practical though I do not wish to limit myself to any specific form of material. While I have shown the shield 26 and locking ring 29 as formed in one annular piece it will be understood that I may form them of as many sections as I desire.

From the foregoing description and a study of the drawing it will be apparent that I have thus provided a wheel having a rim which is quickly and easily attached and detached and which will be securely locked in place.

It will be readily understood that I reserve the right to make various changes in the form, construction, arrangement and combination of parts without departing from the spirit of the invention or limiting the scope of the subjoined claims.

Having thus described my invention, I claim:

1. A vehicle wheel comprising a hub, spokes radiating therefrom, a stationary rim carried by said spokes, a removable rim slidable laterally onto said stationary rim and provided with openings alining with openings in said stationary rim, a channeled annular ring secured upon said stationary rim and provided with enlarged sockets, bolts slidable radially within said sockets and a locking ring disposed within said channeled ring and provided with cam surfaces engaging said bolts, whereby rotation of said locking ring will force said bolts outwardly through the alined holes in said stationary rim and said removable rim.

2. A vehicle wheel comprising a hub, spokes radiating therefrom, a felly carried by said spokes, a felly band surrounding said felly, said felly band being provided with a plurality of holes, wedge-shaped socket members on the outer periphery of said felly band at said holes, a removable tire receiving rim slidable laterally onto said felly band and provided upon its inner periphery with wedge shaped projections engaging within said socket members, an annular ring channeled in cross section secured upon the inner periphery of said felly band and provided with slots, said channeled ring being further provided with enlarged sockets, bolts slidable radially within said sockets and bifurcated at their inner ends, a locking ring revoluble within said channeled ring and disposed within the furcations of said bolts, pins extending across the bifurcations of said bolts and engaging the inner periphery of said locking ring, said locking ring being provided with cam surfaces engaging said bolts and said pins, and operating handles secured on said locking ring and extending inwardly through the slots in said channeled ring whereby said locking ring may be moved circumferentially within said channeled ring for forcing said bolts through the openings in said felly band and into recesses in said wedge shaped projections.

3. A vehicle wheel comprising a hub, spokes radiating therefrom, a stationary rim carried by said spokes, a removable rim on said stationary rim, both of said rims being provided with alined holes, a channeled ring secured on said stationary rim, a plurality of bolts slidable radially through said channeled ring, a locking ring slidable circumferentially through said channeled ring and provided with cam surfaces engaging said bolts for moving them radially, handles secured on said locking ring and extending through slots in said channeled ring, and means for holding said handles against movement retracting said bolts, said means comprising arms pivoted upon said channeled ring and provided with recesses receiving the ends of said handles, and catches preventing swinging of said arms.

In testimony whereof I affix my signature, in the presence of two witnesses.

BOYD FISHER MERTZ.

Witnesses:
G. P. MERTZ,
W. H. MERTZ, Jr.